United States Patent [19]
Vischer et al.
[11] 4,122,937
[45] Oct. 31, 1978

[54] METHOD AND APPARATUS FOR DISCHARGING CONTAINERS FROM A CLOSED LOOP CONTAINER CARRIER

[75] Inventors: Peter Vischer, Golden; Paul J. Artzer, Broomfield, both of Colo.

[73] Assignee: Coors Container Company, Golden, Colo.

[21] Appl. No.: 660,723

[22] Filed: Feb. 23, 1976

[51] Int. Cl.² ............................................ B65G 47/52
[52] U.S. Cl. .................................... 198/408; 198/426; 198/598; 198/600
[58] Field of Search ................ 198/20 R, 22 R, 22 B, 198/25, 26, 31 R, 31 AA, 131, 278, 279, 406, 408, 526, 598, 647, 796, 480, 483, 426, 600, 539

[56] References Cited

U.S. PATENT DOCUMENTS

| | | | |
|---|---|---|---|
| 2,806,579 | 9/1957 | Marasso | 198/31 AA |
| 2,858,929 | 11/1958 | Vamvakas | 198/25 |
| 3,101,834 | 8/1963 | Meyer | 198/131 |
| 3,110,387 | 11/1963 | Meyer et al. | 198/25 |
| 3,121,489 | 2/1964 | Meyer et al. | 198/25 |
| 3,178,005 | 4/1965 | Read | 198/25 X |
| 3,233,718 | 2/1966 | Ladewig et al. | 198/131 X |
| 3,406,808 | 10/1968 | Babunovic | 198/22 X |
| 3,420,353 | 1/1969 | Babunovic | 198/25 X |
| 3,517,793 | 6/1970 | Böcker | 198/25 |
| 3,934,703 | 1/1976 | Vamvakas et al. | 198/25 X |
| 4,022,315 | 5/1977 | Hori et al. | 198/480 |

FOREIGN PATENT DOCUMENTS

| | | | |
|---|---|---|---|
| 950,773 | 2/1964 | United Kingdom | 198/25 |

*Primary Examiner*—Evon C. Blunk
*Assistant Examiner*—Richard K. Thomson
*Attorney, Agent, or Firm*—Bruce G. Klaas; Dennis K. Shelton

[57] ABSTRACT

Containers are discharged from a continuously operable, closed loop container carrier, having a multiplicity of parallel longitudinally and transversely aligned rows of container baskets with each container basket being offset from adjacent container baskets in adjacent rows, by a method and apparatus in which containers in alternate transverse rows of container baskets are transferred from the container carrier to a first discharge conveyor by a first container transfer means and containers in the other alternate transverse rows of container baskets are supported in the carrier past the first container transfer means and are transferred from the container carrier to a second discharge conveyor by a second container transfer means.

20 Claims, 16 Drawing Figures

METHOD AND APPARATUS FOR DISCHARGING CONTAINERS FROM A CLOSED LOOP CONTAINER CARRIER

BACKGROUND AND SUMMARY OF THE INVENTION

This application relates to a new and improved container handling method and apparatus and more particularly to a new and improved method and apparatus for discharging containers from a continuously operable, closed loop container carrier of a container washing system having a multiplicity of container baskets arranged in a staggered configuration.

In the beverage industry, it is a common practice to recycle beverage containers such as beer bottles and soft drink bottles for environmental reasons and to conserve packaging materials. To recycle glass bottles, the bottles are commonly fed to a multistage bottle soaker which subjects the bottles to caustic solutions of varying concentration and temperature, and then to rinse water. The caustic solutions dissolve or wash away foreign matter in or on the bottles including prior beverage residue, labels and waste materials such as cigarettes, gum, paper products, mold, animal parts, etc. The bottles are commonly loaded onto a bottle carrier, carried through the soaker, unloaded from the carrier, manually or automatically inspected for breakage or foreign residues and then are transported outside of the recycling plant or directly sent to further processing such as filling, labeling, packaging, etc. The efficiency of the soaking operation is dependent upon, inter alia, the capacity of the soaking apparatus, the critical retention time required for removing foreign deposits, and the ability to rapidly load and unload bottles from the carrier with the least possible degredation to the bottle surfaces. The soaking operation can potentially be made more efficient by increasing the capacity of the bottle carrier, for example, by constructing bottle baskets in the carrier in a closely adjacent, staggered manner with each basket being offset from adjacent baskets in adjacent transverse and longitudinal rows. However, due to a lack of capacity in the unloading step of prior apparatus, such a configuration has resulted in a relatively high percentage of bottles being jammed and/or broken unless unloading is carried out intermitently.

This and other deficiencies can be overcome by a new and improved method and apparatus for discharging containers from such a continuously operable, closed loop container carrier. Increased discharge capacity is obtained by transferring containers in alternate transverse rows of container baskets from the carrier to a first discharge conveyor, supporting the containers in the other alternate, offset transverse rows of container baskets within the container carrier beyond the point of transfer of the containers in the alternate transverse rows of container baskets, and then transferring the containers in the other alternate, offset transverse rows of container baskets from the carrier to a second discharge conveyor. Apparatus of the invention comprises a continuously operable, closed loop container carrier for carrying containers through a container processing system, the carrier having parallel rows of container baskets with each container basket being transversely and longitudinally offset from adjacent baskets in adjacent rows, a first container transfer means for receiving containers from alternate transverse rows of container baskets of the closed loop container carrier and transferring the containers to a first discharge conveyor, a second container transfer means spaced from the first container transfer means for receiving containers from the other alternate transverse rows of container baskets and transferring the containers to a second discharge conveyor, container support means extending between said first and second container transfer means for supporting containers in the other alternate transverse rows of container baskets as they are moved from said first container transfer means to said second container transfer means, and first and second discharge conveyors for receiving containers from the first and second container transfer means and transferring the containers to a remote point for further processing. All of the containers are removed from the continuously operable, closed loop carrier during continuous operation of the apparatus without interference between containers from adjacent rows when the containers are unloaded from the carrier.

BRIEF DESCRIPTION OF THE DRAWING

The inventive concepts are illustrated on the accompanying drawing in apparatus comprising a presently preferred embodiment in which.

DESCRIPTION OF AN ILLUSTRATIVE EMBODIMENT OF THE INVENTION

Although the inventive concepts will be hereinafter described in a presently preferred association with a method and apparatus for washing and rinsing bottles, it is contemplated that the inventive concepts may be variously otherwise applicable to discharging containers or other articles from an endless container carrier having container baskets in closely adjacent, transversely and longitudinally offset rows. As used herein, the terms transverse and transversely relate to a direction perpendicular to the direction of travel of the continuously operable, closed loop bottle carrier and the terms longitudinal and longitudinally relate to a direction parallel to the direction of travel of the bottle carrier.

APPARATUS IN GENERAL

Figure 1:
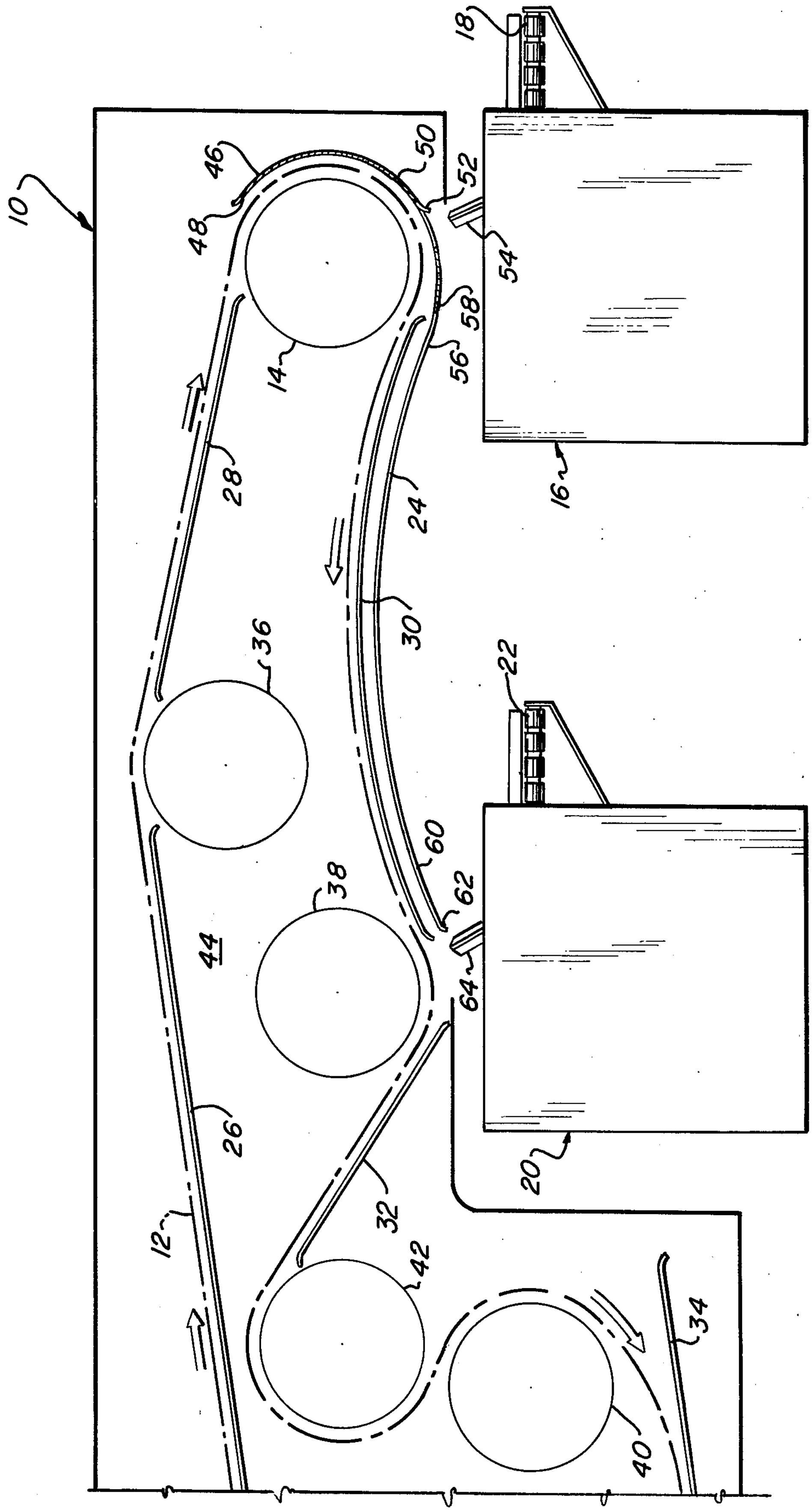
FIG. 1 is a schematic side elevational view, partly in cross-section, of illustrative apparatus of the invention.
Figure 2:
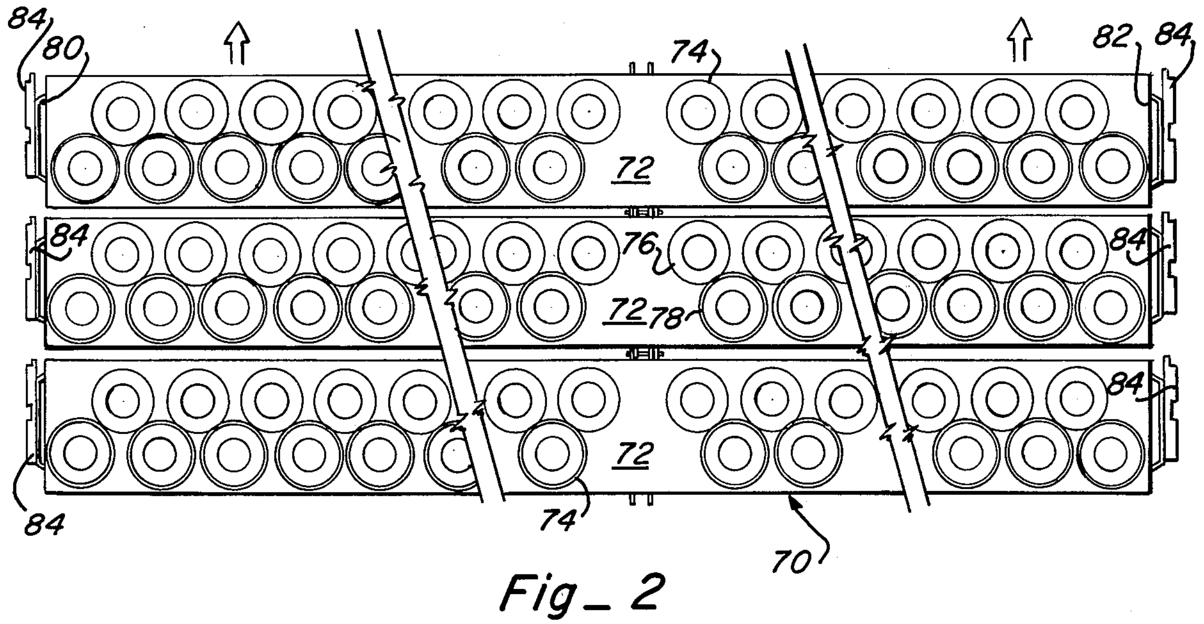
FIG. 2 is a top view of a portion of an illustrative closed loop container carrier of the apparatus of FIG. 1.
Figure 3:
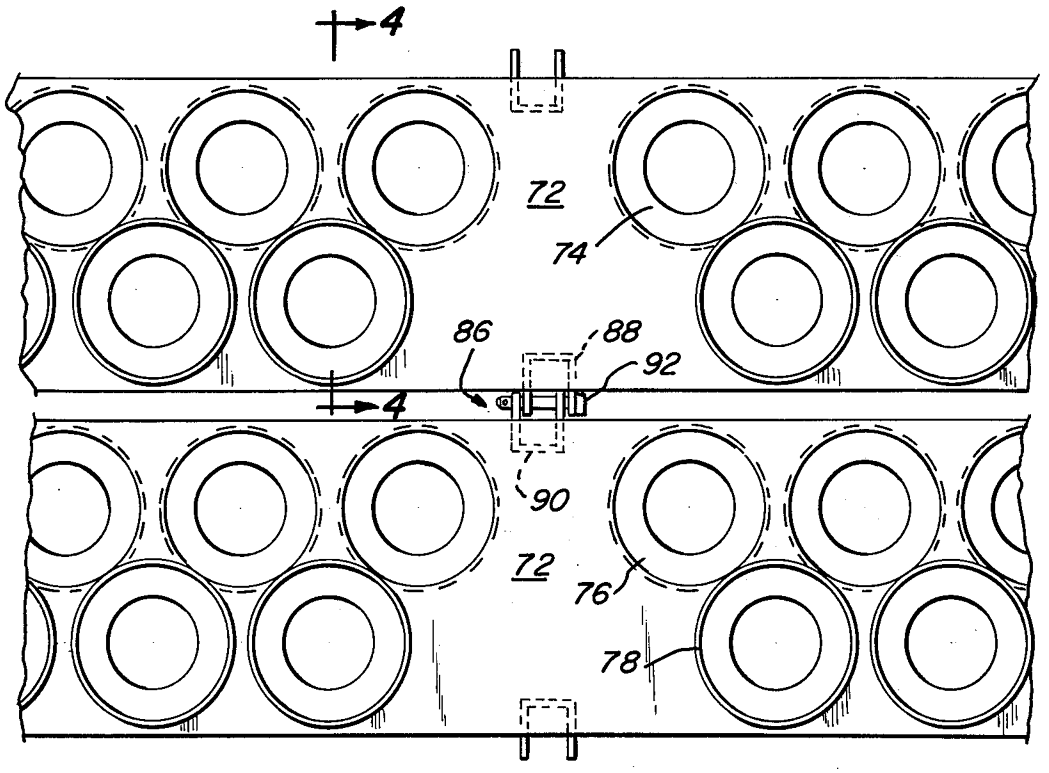
FIG. 3 is an enlarged top view of the top two carrier sections of a center section portion of the apparatus of FIG. 2 enclosed approximately within the broken lines in FIG. 2.

Referring now to FIG. 1, bottle discharge apparatus 10 of a multiple stage bottle soaking apparatus is located adjacent the rinsing stage (not shown) of the soaking apparatus. A continuously operable, closed loop bottle carrier having a multiplicity of bottle baskets for receiving bottles and holding the bottles in a generally inverted position during a portion of the path of movement of the carrier through the bottle soaker and discharge apparatus travels through the discharge apparatus in a direction indicated by the arrows along a path generally indicated by dashed line 12. The carrier is continuously operable in a closed loop through the bottle soaking apparatus with only the portion of its movement through the discharge apparatus being shown in FIG. 1. The bottle baskets are arranged in a staggered configuration in the bottle carrier in closely adjacent parallel transverse and longitudinal rows in which each individual basket is offset from adjacent baskets in adjacent transverse and longitudinal rows. At the discharge end of the closed path of the bottle carrier, the carrier becomes generally inverted as it is guided around idler wheel 14, at which point it no longer completely supports bottles contained in the bottle baskets. A first bottle transfer means, such as cam wheel-type bottle transfer system 16, for receiving bottles from alternate transverse rows of bottle baskets and transferring the bottles to a first discharge conveyor 18 is located beneath the bottle carrier and idler wheel 14. A second bottle transfer means, such as cam wheel-type bottle transfer system 20, for receiving bottles from the other alternate transverse rows of bottle baskets and transferring the bottles to a second discharge conveyor 22, is located beneath the bottle carrier and is spaced from the first bottle transfer means. Means for supporting bottles in the other alternate transverse rows of bottle baskets between the first bottle transfer means and the second bottle transfer means, such as bottle support platform 24, extends between the first and second bottle transfer means. First and second discharge conveyors 18, 22, for receiving bottles from the first and second bottle transfer means and transporting the bottles to a remote point for further processing, are located adjacent the first and second bottle transfer means, respectively.

The continuously operable, closed loop bottle carrier is attached at its side edges to interconnecting chain links and support rollers (not shown) which guide and support the carrier in the discharge apparatus. The support rollers are, in turn, supported by roller support members 26, 28, 30, 32, 34 and idler wheels 36, 14, 38, 40. Drive wheel 42 drives the bottle carrier through the discharge apparatus 10. While only one each of the individual roller support members, idler wheels and drive wheel are shown in FIG. 1 as being suitably mounted on the rear sidewall 44 of the discharge apparatus 10, it should be noted that matching roller support members, idler wheels and drive wheel are similarly mounted on the front sidewall (not shown) of the discharge apparatus to provide support and power drive for the closed loop carrier at both of its outer edges.

Means for providing support for bottles in the bottle baskets as the bottle carrier is inverted, such as curved guide and support platform 46, extends from rear sidewall 44 to the front sidewall (not shown) of the discharge apparatus 10 and is radially spaced a sufficient distance from idler wheel 14 to allow the loaded bottle carrier to pass therebetween with sufficient spacing to prevent damage to the bottles. As the bottle carrier passes around idler wheel 14, the bottle baskets become inverted below a horizontal plane through the axis of idler wheel 14 and the bottle carrier then no longer completely supports the bottles in the carrier. At this point, the bottles tend to slide out of the bottle baskets of the bottle carrier and become at least partially supported by the smooth upper surface 48 of guide and support platform 46.

Curved support means, such as curved support platform 50, extending from rear sidewall 44 to the front sidewall (not shown) of the apparatus 10 and spaced radially outwardly from idler wheel 14 in abutting engagement with curved guide and support platform 46, is adapted, as will be hereinafter described, to allow the discharge of bottles in alternate transverse rows of bottle baskets into the first bottle transfer means while providing support for bottles in the other alternate transverse rows of bottle baskets. Downwardly curved discharge guide members 52 of support platform 50, one of which is shown in FIG. 1, guide bottles in the alternate transverse rows of bottle baskets as they are discharged into the first bottle transfer means. Bottle guide members 54, one of which is shown in FIG. 1, are adapted to guide bottles as they leave the closed loop bottle carrier and enter the first bottle transfer means 16. A first discharge conveyor 18, adjacent the first bottle transfer means 16, is adapted to receive bottles from the first bottle transfer means and to transport the bottles to a remote point for further processing.

Support means, such as curved support platform 24, extending from rear sidewall 44 to the front sidewall (not shown) of discharge apparatus 10, has upstream end 56 in abutting engagement with the downstream end 58 of support platform 50 to provide a smooth, continuous support surface for the bottles which are not discharged into the first bottle transfer means. Downstream end 60 of curved support platform 24 terminates in a downwardly curved lip portion 62 above the second bottle transfer means 20. Bottle guide members 64, one of which is shown in FIG. 1, are adapted to guide the bottles as they slide out of the closed loop bottle carrier and enter the second bottle transfer means 20. The second discharge conveyor 22, adjacent the second bottle transfer means 20, is adapted to receive bottles from the second bottle transfer means and to transport the bottles to a remote point for further processing.

Carrier path 12 further extends around drive wheel 42 and idler wheel 40, and returns to loading apparatus adjacent the first stage of the bottle soaking apparatus (not shown) for reloading of the carrier with additional bottles.

CLOSED LOOP BOTTLE CARRIER

Referring now to FIGS. 2–6, a portion of illustrative continuously operable, closed loop bottle carrier 70, generally comprises relatively long length and relatively narrow width rectangular carrier sections 72 having a multiplicity of bottle baskets 74 formed therein. The bottle baskets are arranged in a staggered configuration in closely spaced transverse and longitudinal rows with each carrier section 72 containing two transverse rows, e.g., rows 76, 78, of bottle baskets in which the bottle baskets in row 78 are transversely and longitudinally offset from adjacent bottle baskets in row 76. In this manner, each carrier section 72 comprises a transverse row pair of bottle baskets with each bottle basket being transversely and longitudinally offset from baskets in adjacent transverse and longitudinal rows. Carrier sections 72 are suitably attached to interconnecting chain links and support rollers (not shown) at their outside edges 80, 82, by attachment members 84 and retaining pins (not shown). In addition, the carrier sections are hingedly connected together at approximately the center of the carrier sections by a suitable hinge 86, such as U-joints 88, 90 and retaining pin 92, FIG. 3. Each carrier section may contain, for example, 40 bottle baskets in each transverse row, or 80 bottle baskets in a carrier section. The carrier sections are constructed out of a material, as for example, sheet metal, having been formed to attain sufficient strength to resist buckling or significant distortion when fully loaded with bottles.

Figure 4:
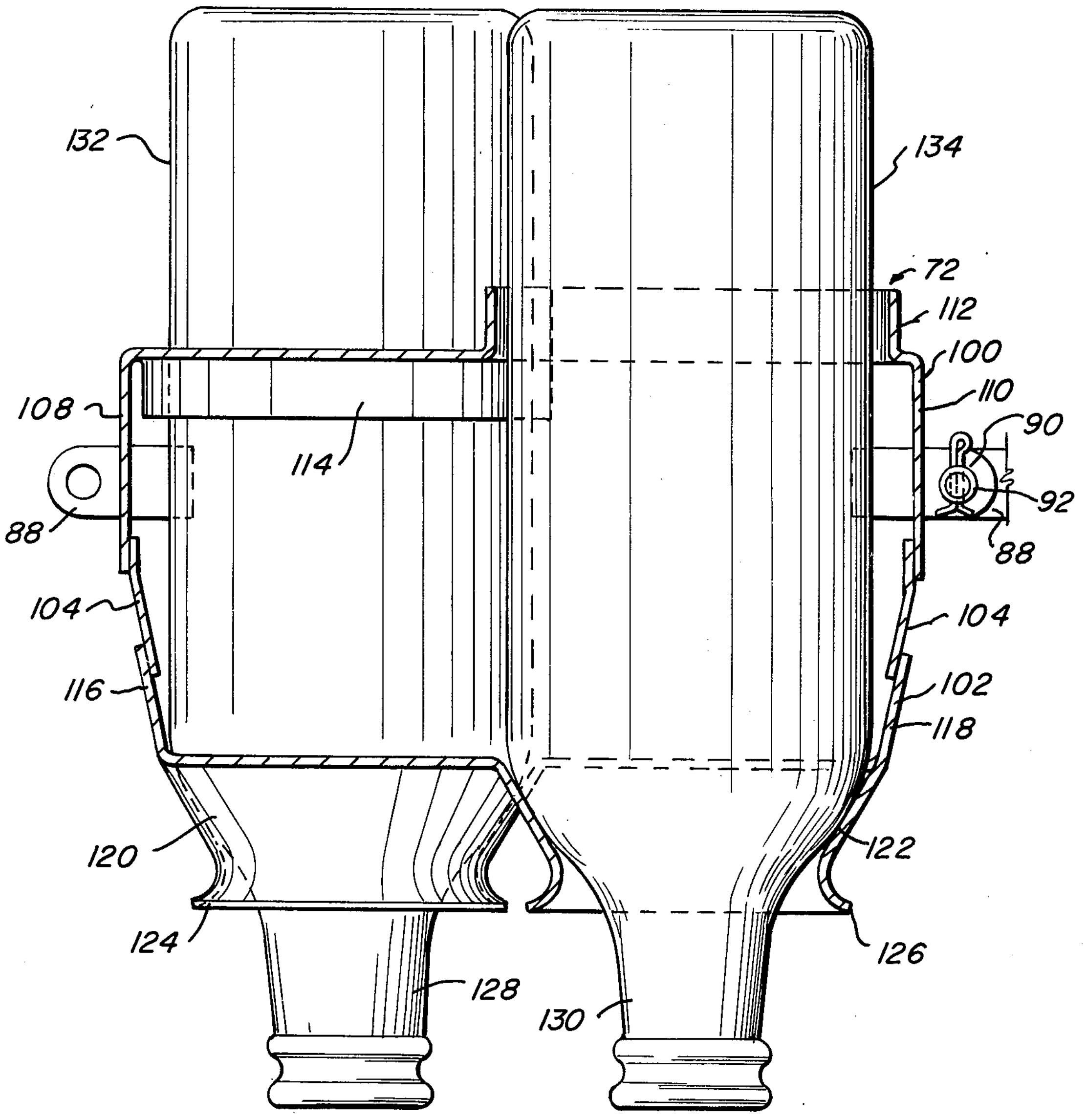
FIG. 4 is an enlarged side elevational view in cross-section of a portion of the apparatus of FIGS. 2 and 3 showing containers in association with the container carrier.

Referring now to FIG. 4, each carrier section 72 comprises an upper portion 100 and a lower portion 102 which are fixedly retained in spaced relationship by support plates 104 and spot welds (not shown).

Upper portion 100 comprises substantially parallel sidewalls 108, 110, cylindrical upwardly extending flange members 112 on baskets in one transverse row of baskets of the transverse row pair and cylindrical downwardly extending flange members 114 on baskets in the other offset transverse row of bottle baskets of the transverse row pair.

Lower portion 102 comprises slightly downwardly, inwardly extending conical sidewall portions 116, 118, downwardly, inwardly extending conical neck portions 120 on baskets in one transverse row of baskets of the transverse row pair, downwardly inwardly extending conical neck portions 122 on baskets in the other offset transverse row of baskets of the transverse row pair and downwardly, outwardly extending conical flange portions 124, 126, respectively.

Illustrative bottles 128, 130 are loaded into the bottle baskets. The sidewalls 132, 134 of bottles 128, 130 are supported in two coordinates in a restrained position by flange members 112, 114, respectively, while being transported. The bottles are retained in the third coordinate in a stable position with respect to the bottle baskets by conical sidewall portions 116, 118 and conical neck portions 120, 122. When the bottle baskets are inverted, bottles 128, 130 readily slide from the bottle baskets in a generally upright position.

Figure 5:
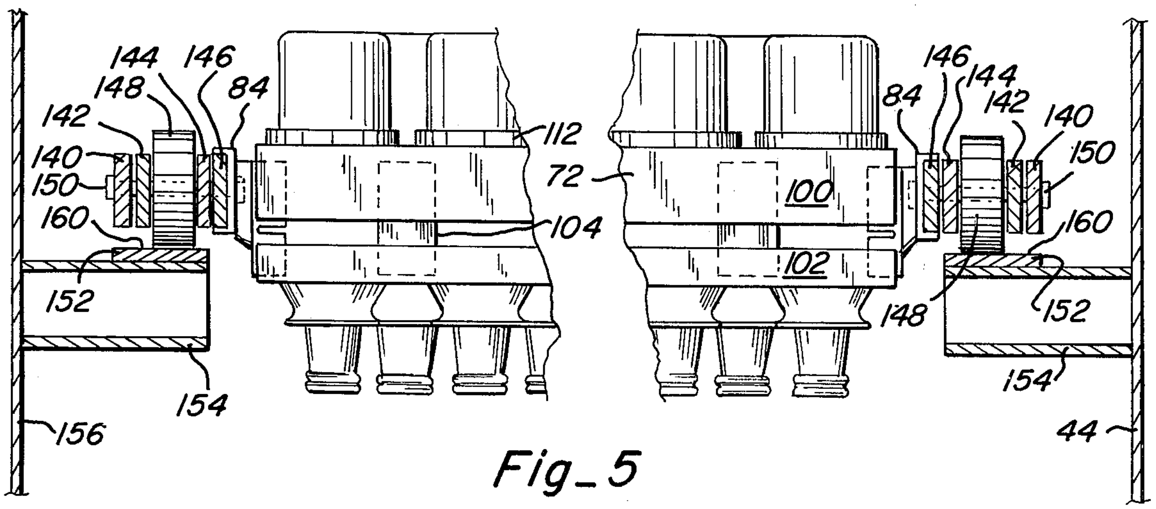
FIG. 5 is an enlarged end view in cross-section of a portion of the container carrier support members of the apparatus of FIG. 1.
Figure 6:
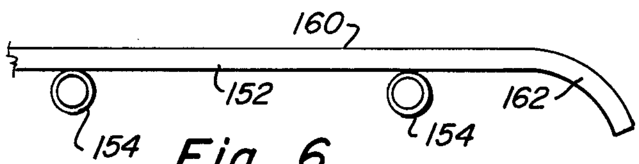
FIG. 6 is a side elevational view of a portion of the apparatus of FIGS. 1 and 5.

Referring now to FIG. 5, the continuously operable, closed loop bottle carrier is attached at its side edges to interconnecting chain links 140, 142, 144, 146, and support rollers 148. Chain links 140, 144 interconnect carrier section 72 with the adjacent downstream carrier section, while chain links 142, 146 interconnect carrier section 72 with the adjacent upstream carrier section. The chain links 140–146 and rollers 148 are attached to carrier section 72 by means of attachment members 84 and retaining pins 150, adapted to allow the chain links and rollers to rotate thereabout. The rollers 148 are supported in discharge apparatus 10 by means of roller support members 152 and mounting members 154, such as a section of pipe or angle iron perpendicularly attached to the discharge apparatus sidewalls 44, 156, for mounting the roller support members 152 a fixed horizontal distance, e.g., about 6 inches from the discharge apparatus sidewalls 44, 156. Roller support members 152 have smooth upper support surfaces 160 over which rollers 148 pass as the carrier is driven through the discharge apparatus. As shown in FIG. 6, roller support member 152 may be curved at end portion 162 in a direction generally away from support surface 160 to prevent the carrier sections from catching on the end of the support member.

BOTTLE SUPPORT MEANS

Figure 7:
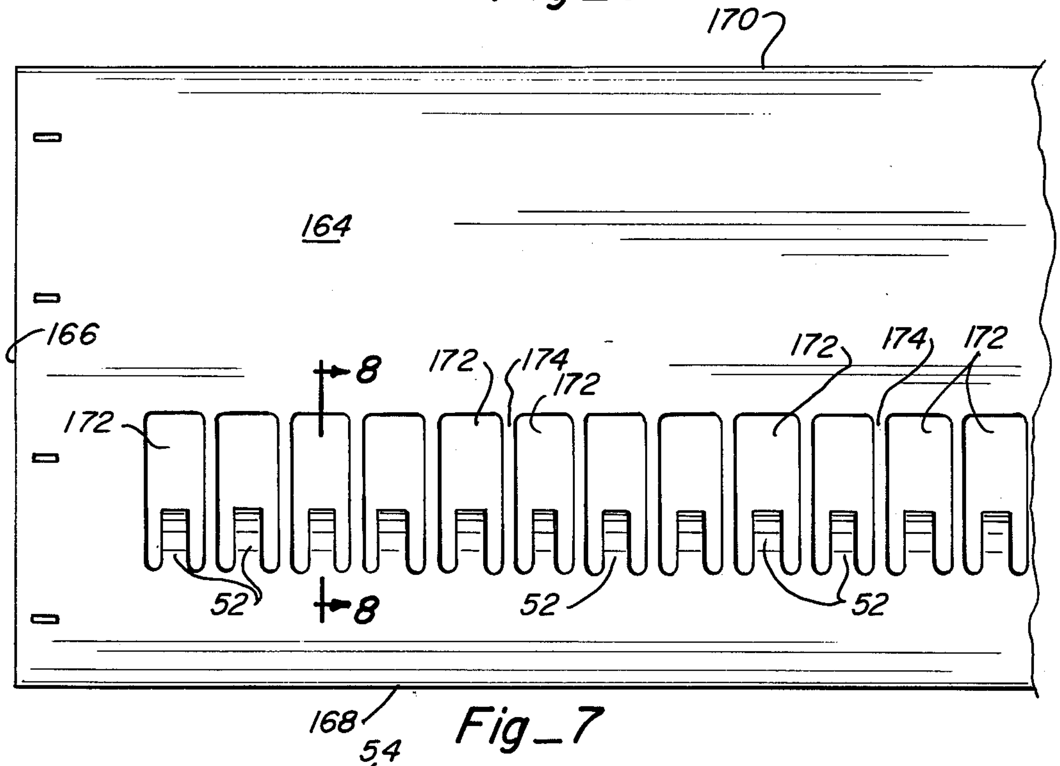
FIG. 7 is a top view of a portion of an illustrative container support means of the apparatus of FIG. 1.
Figure 8:
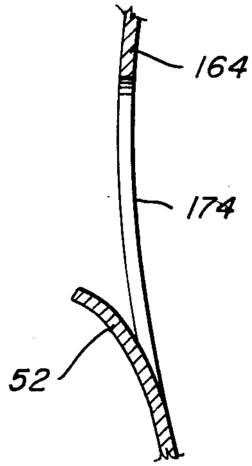
FIG. 8 is an enlarged side elevational view of a portion of the apparatus of FIGS. 1 and 7.

Referring now to FIGS. 7–8, support platform 50 (FIG. 1) comprises generally rectangular curved bottle support surface 164 defined by edge portions 166, 168, 170, and a fourth edge portion opposite edge 166 (not shown) and discharge ports 172 defining discharge guide members 52 and relatively long length and relatively narrow width intermediate linking support surfaces 174. As shown in FIGS. 1 and 8, the discharge guide members 52 are curved downwardly with respect to curved support surface 164 and intermediate linking support surfaces 174. The support platform extends from the rear sidewall 44 to the front sidewallof discharge apparatus 10 with edge 168 in abutting relationship with curved guide and support platform 46 to provide a smooth, continuous bottle support surface. Discharge ports 172 are aligned with bottle baskets in alternate transverse rows, from which bottles slide out of the closed loop bottle carrier and enter the first bottle transfer means 16 and with intermediate linking support surfaces 174 aligned with bottle baskets in the other alternate transverse rows of bottle baskets, from which bottles are discharged at the second bottle transfer means 20. In this manner, as a carrier section containing two longitudinally and transversely offset, transverse rows of bottle baskets passes over support platform 50, bottles in alternate transverse rows of bottle baskets are discharged by sliding through discharge ports 172, over discharge guide members 52 and along bottle guide members 54 into the first bottle transfer means 16, while bottles in the other alternate, offset transverse rows of bottle baskets are supported by intermediate linking support surfaces 174, by curved support surface 164 and finally by bottle support platform 24 until they slide out of the bottle baskets and enter the second bottle transfer means 20.

BOTTLE TRANSFER MEANS

Referring now to FIGS. 1, and 9–12, bottles are received from the bottle carrier and transferred to the first and second discharge conveyors by first and second bottle transfer means, such as cam wheel-type bottle transfer systems 16, 20. The bottles are guided into the transfer systems by bottle guide members 56, 64.

Figure 11:
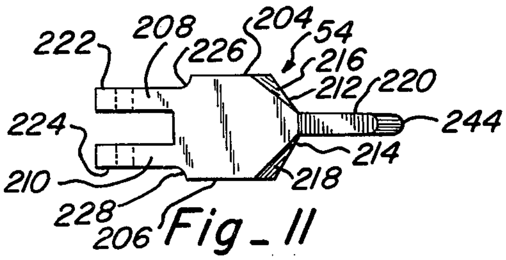
FIG. 11 is a top view of a portion of the apparatus of FIGS. 1, 9, and 10.
Figure 10:
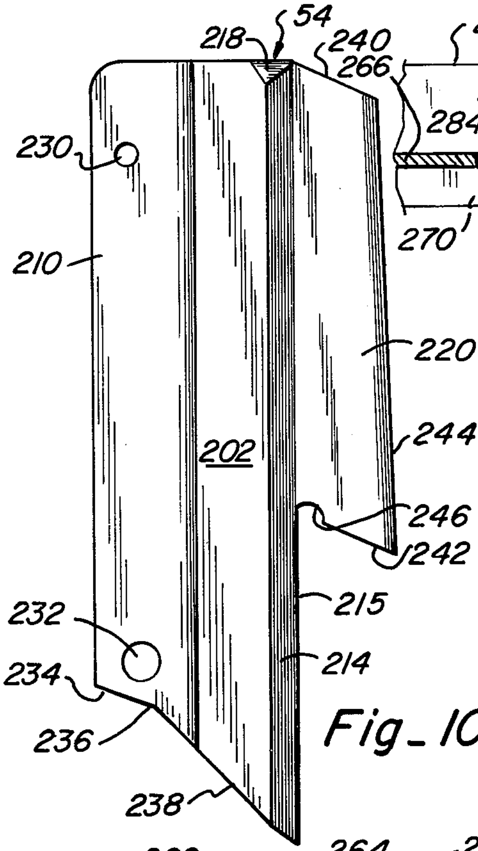
FIG. 10 is a side elevational view of a portion of the apparatus of FIGS. 1 and 9.

The bottle guide members 54, 64, as shown in FIGS. 10 and 11, comprise elongated body members 202 having parallel sides 204, 206, parallel spaced elongated mounting members 208, 210, inwardly sloping guide surfaces 212, 214, downwardly sloping guide surfaces 216, 218 and protruding bottle guide member 220. The parallel spaced mounting members 208, 210 have outer side surfaces 222, 224 somewhat recessed from parallel sides 204, 206 of elongated body member 202 and integrally connected thereto by curved surfaces 226, 228. The mounting members also have passageways 230, 232 therethrough adapted to receive suitable mounting pins to hingedly mount the bottle guide members in the bottle transfer apparatus as will be hereinafter further described. The bottom edge surface 234 of the mounting members is relatively slightly downwardly sloped to meet at juncture 236 with relatively more highly downwardly sloped bottom edge surface 238. Protruding bottle guide member 220 is integrally formed with elongated body member 202 and comprises generally parallel downwardly sloped upper and lower flat surfaces 240, 242 and downwardly, outwardly sloped generally rounded edge surface 244. Lower surface 242 is interconnected with elongated body member 202 by generally circular edge surface 246. Rounded edge surface 244 is slightly downwardly, outwardly sloped with respect to edge 215 of guide surface 214 so that lower surface 242 is of slightly greater width than upper surface 240.

Figure 9:
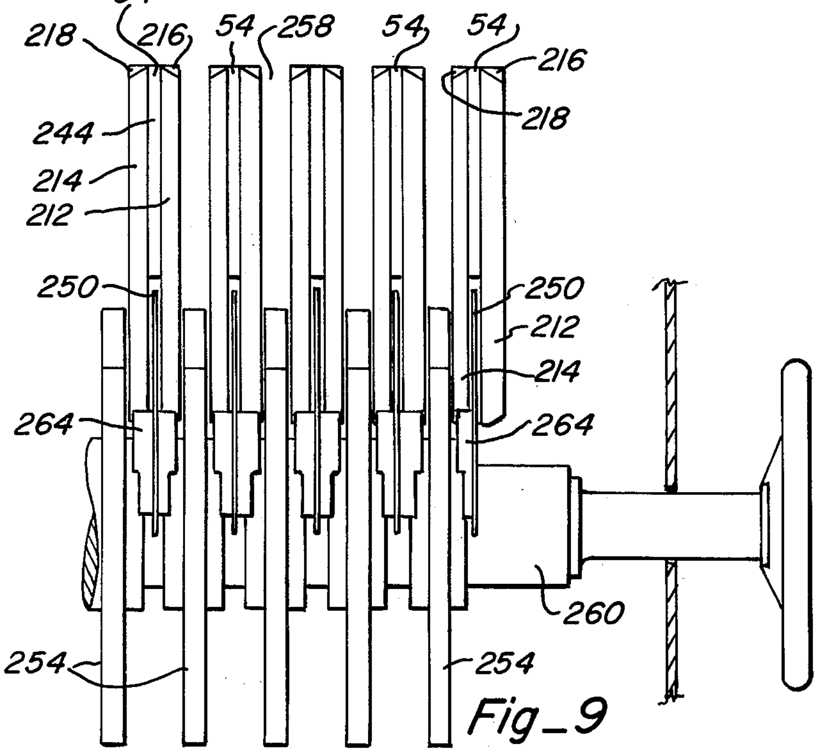
FIG. 9 is an end elevational view of a portion of the first cam wheel-type container transfer system of the apparatus of FIG. 1.
Figure 12:
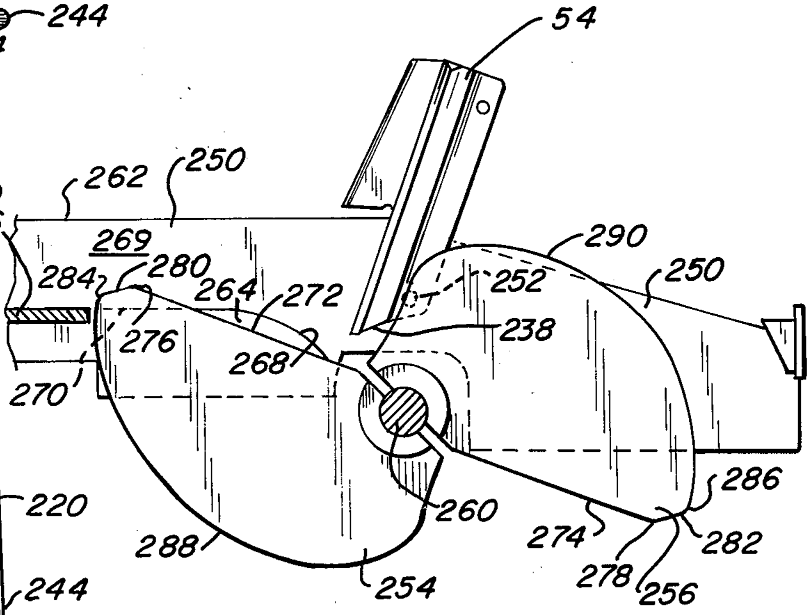
FIG. 12 is a side elevational view of a portion of the apparatus of FIGS. 1 and 9.

Referring now to FIGS. 9 and 12, bottle guide members 54 are mounted in the cam wheel-type bottle transfer system with passageways 232 (FIG. 10) being hingedly connected to bottle guide plates 250 by mounting pin 252 and with bottom surface 238 terminating somewhat above central drive shaft member 260. The bottle guide members are horizontally spaced a sufficient distance to permit cam wheel members 254, 256 of the cam wheeltype transfer system to pass therebetween, thereby defining bottle passageways 258 between adjoining guide members. The top portion of the bottle guide members may be suitably hingedly attached through passageway 230 to safety shutdown apparatus (not shown) which is engaged and shuts down the discharge apparatus if bottles should become jammed in the cam wheel-type bottle transfer system.

The apparatus as previously described is located generally beneath bottle support platform 50 or beneath the downstream end 60 of bottle support platform 24 with bottle passageways 258 being in general alignment with the bottle baskets from which bottles slide into the first or second bottle transfer means, respectively.

The cam wheel-type bottle transfer system further comprises bottle guide plate members 250 fixedly mounted in the bottle transfer system parallel to one another and perpendicular to drive shaft 260. The guide plate members are horizontally spaced so as to be located between the bottom portion of the parallel spaced elongated mounting members 208, 210 of bottle guide members 54 as shown in FIG. 9. The top edge portion 262 of the bottle guide plate members 250 is elevated at substantial distance, e.g., 6 inches, above bottle support platform elements 264 and adjacent support platform 266 to form a guide surface 269 for guiding bottles as they are passed over the bottle support platform elements 264 and adjacent support platform 266.

Bottle support platform elements 264 have upper curved surface portions 268 (FIG. 12) extending from a point somewhat below bottle guide members 54 to an elevated level and terminating in upper flat surface portions 270 adjacent support platform 266. The platform elements are of relatively thin width, e.g., about 1 inch, and are located in spaced relationship allowing passage of the cam members therebetween. The platform elements may be fixedly attached to bottle guide plates 250 by suitable mounting means (not shown).

The cam wheel-type bottle transfer systems 16, 20, further comprise a plurality of pairs of cam members 254, 256, FIG. 12, perpendicularly mounted on radially opposite sides of drive shaft member 260. The cam members 254, 256 have relatively long flat surfaces 272, 274, relatively rounded interconnecting surfaces 276, 278, relatively short flat surfaces 280, 282, rounded tip portions 284, 286, and relatively long curved surfaces 288, 290. The cam members are of sufficient width, e.g., about 1 inch, to provide adequate support for the bottles as will be hereinafter further described. As seen in FIG. 9, the cam members 254 extend perpendicularly to drift shaft member 260 and in between bottle guide members 54, bottle guide plates 250, and bottle support platform elements 264.

DISCHARGE CONVEYORS

Figure 13:
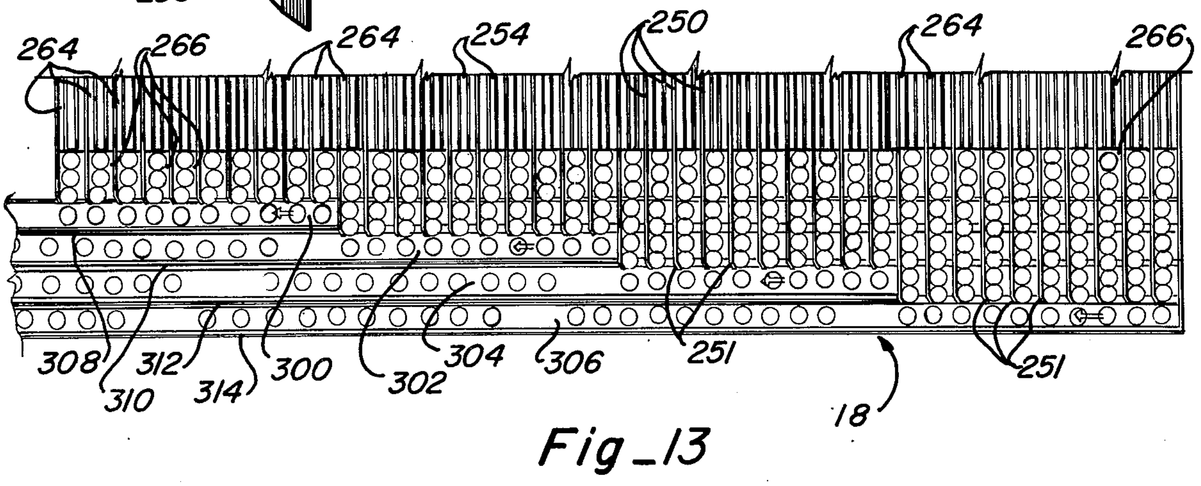
FIG. 13 is a top view of an illustrative discharge conveyor of the apparatus of FIGS. 1, 9, and 10.

Referring now to FIG. 13, the first and second discharge conveyors, such as conveyor 18, may comprise continuous conveyor lanes 300, 302, 304, 306 separated by bottle guide rails 308, 310, 312 and outside rail 314. The discharge conveyors are located parallel to drive shaft member 260, FIG. 12, and in spaced relationship to platform elements 264, with bottle support platform 266 located therebetween, and at approximately the same vertical height as the upper flat surface portions 270 of the platform elements 264, so that as bottles are pushed off of the platform elements 264 they are pushed onto platform 266. The bottles are guided across support platform 266 by bottle guide plates 250. As additional rows of bottles are discharged by the cam wheel-type bottle transfer system onto support platform 266, bottles already resting on the support platform are pushed onto lane 300, onto the next succeeding lane 302, etc., until they are transported along the conveyor lanes when released from bottle guide plates 250. The bottle guide plates 250 are slightly curved in an upstream direction at their ends 251 to prevent bottles from "walking" onto the conveyor lanes, due to vibration of the conveyor, until they are pushed onto the conveyor lanes by the next succeeding bottle. The bottles are then carried by the discharge conveyor apparatus in the direction of the arrows in FIG. 13, to a remote point for further processing in the bottle recycling operation.

OPERATION

In the operation of the aforedescribed apparatus, central drive shaft member 260 of bottle transfer means 16, 20 is driven by suitable drive means (not shown) to cause the cam members to rotate thereabout. Simultaneously, the closed loop carrier is driven through the discharge apparatus by drive wheel 42 and suitable drive means (not shown), which may be the same as or independent of the means for driving the drive shaft member 260.

Figure 14:
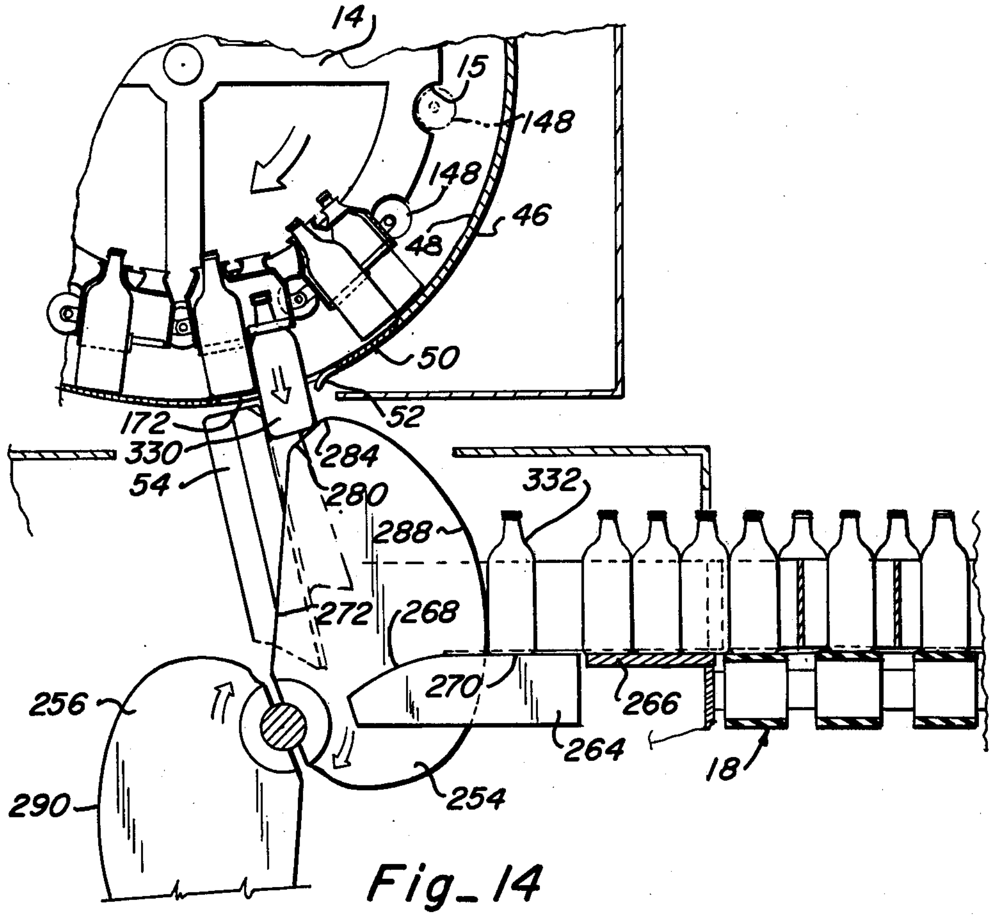
FIGS. 14–16 are side elevational views of a portion of the cam wheel-type container transfer apparatus of FIGS. 1, 9, 12, and 13 showing the apparatus during different stages of operation.
Figure 15:
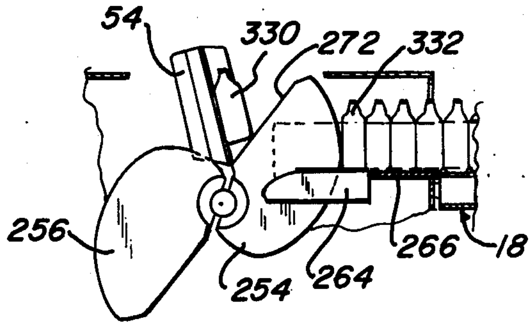
Figure 16:
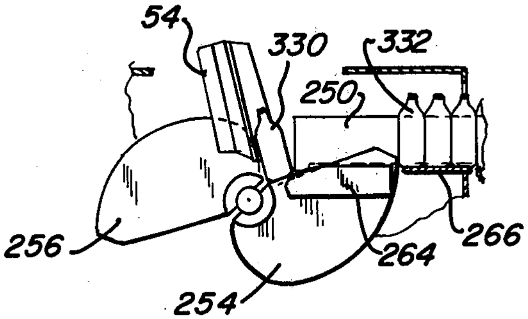

Referring now to FIGS. 14–16, as each individual carrier section reaches idler wheel 14, rollers 148 are received in roller pockets 15 of the idler wheel. As the carrier section passes around the idler wheel, the bottle baskets and bottles contained therein become inverted with support platform 46 providing support for the bottles as they slide out of the bottle baskets.

The rotation of cam members 254, 256 is synchronized with the movement of the closed loop carrier through the discharge apparatus so that as an illustrative bottle 330 slides through a discharge port 172 of support platform 50, the bottle falls a short vertical distance along bottle guide member 54 onto the curved tip portion 284 of cam member 254. As the cam member rotates in a clockwise direction, as indicated by the arrows in FIG. 14, the bottle 330 slides downward along the bottle guide member 54 and is supported first by the relatively short length flat surface 280 of cam member 254 and then by the relatively long length flat surface 272 until the bottle reaches curved support platform elements 264, where the bottle becomes fully supported by the platform elements as shown in FIG. 16. As the cam members further rotate about central drive shaft member 260, the relatively long curved surface 290 of cam member 256, rotating between spaced platform elements 264, then engages the side of bottle 330, pushing the bottle along upper curved surface 268 and upper flat surface 270 of transfer platform elements 264. This process is indicated in FIGS. 14–16 by illustrative bottles 330, 332, with bottle 332 being slid along bottle support platform elements 264 by relatively long curved surface 288 of cam member 254 while bottle 330 is lowered onto the support platform elements by relatively long flat surface 272 of cam member 254. Bottle 332 is then pushed off of support elements 264 by curved tip portion 284 of cam member 254, onto bottle support platform 266 and then by subsequent bottles onto a discharge conveyor generally indicated at 18 in FIG. 14. The rotation of cam members of the second bottle transfer means 20 is similarly synchronized with the movement of the closed loop carrier through the dischrage apparatus so as to receive bottles from the other alternate rows of bottle baskets in a like manner.

In a preferred embodiment of the inventive concepts, discharge ports 172 of support platform 50 are aligned with bottle baskets in the upstream or trailing transverse row of the transverse row pair of each carrier section while intermediate linking support surfaces 174 are aligned with bottle baskets in the downstream or leading row of each carrier section. In this manner bottles in the trailing row of bottle baskets of the transverse row pair of each carrier section are discharged at the first cam wheel-type bottle transfer system and bottles in the leading transverse row of bottle baskets of the carrier section are discharged at the second cam wheel-type bottle transfer system, thereby avoiding interference between the transverse row of bottles being discharged through discharge ports 172 and the offset closely adjacent transverse row of bottles remaining substantially within the carrier and supported by intermediate linking support surfaces 174.

By using the process and apparatus of the present invention, the efficiency of a conventional bottle soaker can be significantly increased. For example, a closed loop bottle carrier having 40 bottle baskets in each transverse row, or 80 bottle baskets in each carrier section, is capable of being continuously driven through the discharge apparatus of the present invention at a relatively high rate without incurring significant incidents of bottle damage or jamming, thereby realizing economical savings over prior continuous discharge systems having lesser capacities and prior intermittant discharge systems.

While inventive concepts have been herein disclosed in reference to a presently preferred and illustrative embodiment of the invention, it is contemplated that these concepts may be variously otherwise employed in alternate arrangements in bottle discharge apparatus. For example, it is contemplated that the closed loop bottle carrier, the support platforms, the guide members and the cam wheel-type bottle transfer systems may be varied to accomodate various containers and applications. Furthermore, the carrier sections may be modified to each contain more or less than 40 container baskets per transverse row, or three or more offset transverse rows of container baskets with containers being transferred to three or more discharge conveyors by three or more container transfer means. It is intended that the appended claims be construed to cover alternate embodiments of the inventive concepts except insofar as precluded by the prior art.

What is claimed is:

1. Apparatus for discharging bottle type containers or the like from a moving closed loop container carrier having a multiplicity of parallel longitudinally and transversely aligned rows of container baskets for supporting containers in the container carrier with each container basket being longitudinally and transversely offset from adjacent container baskets in adjacent longitudinal and transverse rows, and conveying the containers to a remote point for further processing, comprising:

means for inverting a portion of the container carrier to allow containers in the container baskets of the inverted portion to slide therefrom, a first discharge conveyor, a second discharge conveyor, a first container transfer means for receiving containers from alternate transverse rows of container baskets and transferring the received containers to the first discharge conveyor, a second container transfer means for receiving containers from the other alternate transverse rows of container baskets and transferring the received containers to the second discharge conveyor, and means for supporting containers substantially within the container baskets of the inverted portion of the container carrier and allowing containers within alternate transverse rows of container baskets to slide out of the container baskets and into the first container transfer means and containers within the other alternate transverse rows of container baskets to slide out of the container baskets and into the second container transfer means.

2. The apparatus of claim 1 wherein the means for supporting containers substantially within the container baskets of the inverted portion of the container carrier and allowing containers within alternate transverse rows of container baskets to slide out of the container baskets and into the first container transfer means and containers within the other alternate transverse rows of container baskets to slide out of the container baskets and into the second container transfer means is a support platform spaced from the container carrier so as to support the containers substantially within the container baskets of the inverted portion of the container carrier and having discharge ports therethrough defined by interlinking support areas, the discharge ports being aligned with container baskets in alternate transverse rows of container baskets thereby allowing containers within the alternate transverse rows of container baskets to slide out of the container baskets, through the discharge ports and into the first container transfer means and the interlinking support areas being aligned with container baskets in the other alternate transverse rows of container baskets thereby supporting containers in the other alternate transverse rows of container baskets substantially within the container baskets past the discharge ports, the support platform terminating above the second transfer means thereby allowing containers in the other alternate transverse rows of container baskets to slide out of the container baskets and into the second container transfer means.

3. The apparatus of claim 2 wherein the discharge ports of the support platform are further defined by downwardly curved discharge guide members on the upstream side of the discharge ports, the discharge guide members providing guidance for the containers as they slide out of the container baskets and into the first container transfer means.

4. The apparatus of claim 1 wherein the first container transfer means is a cam wheel-type container transfer system.

5. The apparatus of claim 1 wherein the second container transfer means is a cam wheel-type container transfer system.

6. A method of discharging bottle type containers or the like from a moving closed loop container carrier having a multiplicity of parallel longitudinally and transversely aligned rows of container baskets for supporting containers in the container carrier with each container basket being longitudinally and transversely offset from adjacent container baskets in adjacent longitudinal and transverse rows, and conveying the containers to a remote point for further processing, comprising:

inverting a portion of the container carrier to allow containers in the container baskets of the inverted portion to slide therefrom, supporting containers in the container baskets of the inverted portion of the container carrier substantially within the container baskets of the inverted portion, transferring containers substantially within alternate transverse rows of container baskets of the inverted portion of the container carrier from the alternate transverse rows of container baskets to a first discharge conveyor, transferring containers substantially within the other alternate transverse rows of container baskets of the inverted portion of the container carrier from the other alternate transverse rows of container baskets to a second discharge conveyor, and conveying the containers transferred to the first and second discharge conveyors to a remote point for further processing.

7. The method of claim 6 which further comprises allowing containers within the alternate transverse rows of container baskets to slide out of the container baskets prior to transferring the containers to the first discharge conveyor, and allowing containers in the other alternate transverse rows of container baskets to slide out of the container baskets prior to transferring the containers to the second discharge conveyor.

8. The method of claim 7 which further comprises transferring the containers substantially within the container baskets of the other alternate transverse rows of container baskets from the container baskets to the second discharge conveyor by a cam wheel-type container transfer system.

9. The method of claim 6 which further comprises transferring the containers substantially within the container baskets of the alternate transverse rows of container baskets from the container baskets to the first discharge conveyor by a cam wheel-type container transfer system.

10. Apparatus for discharging bottle type containers or the like from a moving closed loop container carrier having a multiplicity of carrier sections with each section containing two parallel longitudinally and transversely offset transverse rows of container baskets for supporting containers in the container carrier and conveying the containers to a remote point for further processing, comprising:

means for inverting the carrier sections to allow containers in the container baskets of the inverted sections to slide therefrom, a first discharge conveyor, a second discharge conveyor, a first container transfer means for receiving containers from one of the transverse rows of container baskets of the carrier sections and transferring the received containers to the first discharge conveyor, a second container transfer means for receiving containers from the other offset transverse row of container baskets of the carrier sections and transferring the received containers to the second discharge conveyor, and means for supporting containers substantially within the container baskets of the inverted carrier sections and allowing containers within the one transverse row of container baskets of the carrier sections to slide out of the container baskets and into the first container transfer means and containers within the other offset transverse row of container baskets of the carrier sections to slide out of the container baskets and into the second container transfer means.

11. The apparatus of claim 10 wherein the means for supporting the containers is a support platform spaced from the container carrier so as to support the containers substantially within the container baskets of the inverted carrier sections and having discharge ports therethrough defined by interlinking support areas, the discharge ports being aligned with container baskets in the one transverse row of container baskets of the carrier sections thereby allowing containers within the container baskets of the one row of container baskets of the carrier sections to slide out of the container baskets, through the discharge ports and into the first container transfer means, and the interlinking support areas being aligned with container baskets in the other offset transverse row of container baskets of the carrier sections thereby supporting containers in the other offset transverse row of container baskets of the carrier sections substantially within the container baskets past the discharge ports, the support platform terminating above the second container transfer means thereby allowing containers in the other offset transverse row of container baskets of the carrier sections to slide out of the container baskets and into the second container transfer means.

12. The apparatus of claim 11 wherein the discharge ports of the support platform are aligned with the container baskets in the upstream transverse row of container baskets of the carrier sections and the interlinking support areas are aligned with the container baskets in the downstream transverse row of container baskets of the carrier sections.

13. The apparatus of claim 11 wherein the discharge ports of the support platform are further defined by downwardly curved discharge guide members on the upstream side of the discharge ports, the discharge guide members providing guidance for the containers as they slide out of the container baskets and into the first container transfer means.

14. The apparatus of claim 10 wherein the first container transfer means is a cam wheel-type container transfer means.

15. The apparatus of claim 10 wherein the second container transfer means is a cam wheel-type container transfer means.

16. A method of discharging battle type containers or the like from a moving closed loop container carrier having a multiplicity of carrier sections with each section containing two parallel, longitudinally and transversely offset transverse rows of container baskets for supporting containers in the container carrier, comprising:

inverting the carrier sections to allow containers in the container baskets of the inverted sections to slide therefrom, supporting containers in the container baskets of the inverted carrier sections substantially within the container baskets of the inverted carrier sections, transferring containers substantially within the container baskets of one of the transverse rows of container baskets of the inverted carrier sections from the container baskets to a first discharge conveyor, transferring containers substantially within the container baskets of the other offset transverse row of container baskets of the inverted carrier sections from the container baskets tȯ a second discharge conveyor, and conveying the containers transferred to the first and second discharge conveyors to a remote point for further processing.

17. The method of claim 16 which further comprises allowing the containers within the one row of container baskets to slide out of the container baskets prior to transferring the containers to the first discharge conveyor, and allowing containers in the other offset transverse row of container baskets to slide out of the container baskets prior to transferring the containers to the second discharge conveyor.

18. The method of claim 16 which further comprises transferring the containers substantially within the container baskets of the one transverse row of container baskets of the carrier sections from the container baskets to the first discharge conveyor by a cam wheel-type container transfer system.

19. The method of claim 16 which further comprises transferring the containers substantially within the container baskets of the other offset transverse row of container baskets of the carrier sections from the container baskets to the second discharge conveyor by a cam wheel-type container transfer system.

20. The method of claim 16 which further comprises transferring the containers substantially within the container baskets in the upstream transverse row of container baskets of the two transverse rows of container baskets of the carrier sections from the container baskets to the first discharge conveyor and transferring the containers substantially within the container baskets in the downstream transverse row of container baskets of the carrier sections from the container baskets to the second discharge conveyor.

* * * * *